United States Patent [19]
Greinacher

[11] Patent Number: 5,871,031
[45] Date of Patent: Feb. 16, 1999

[54] REMOVABLE THREE POSITION VALVE

[76] Inventor: Karl Greinacher, 3258 St. Annes Drive, North Vancouver, British Columbia, Canada, V7P 1B3

[21] Appl. No.: 985,558

[22] Filed: Dec. 5, 1997

[51] Int. Cl.$^6$ ..................................................... F16L 29/00
[52] U.S. Cl. ..................... 137/599; 137/599.2; 137/327; 137/861; 137/614.2
[58] Field of Search ........................... 137/614.2, 614.18, 137/614.17, 843, 861, 855, 886, 866, 223, 599, 599.2, 327; 251/82; 410/119, 125

[56] References Cited

U.S. PATENT DOCUMENTS

| | | |
|---|---|---|
| 4,073,389 | 2/1978 | Angarola et al. ....................... 410/119 |
| 5,082,244 | 1/1992 | Krier et al. . |
| 5,111,838 | 5/1992 | Langston . |
| 5,203,831 | 4/1993 | Lind et al. . |
| 5,275,197 | 1/1994 | Finell ...................................... 137/223 |
| 5,437,301 | 8/1995 | Ramsey . |
| 5,466,104 | 11/1995 | Gatwood . |

Primary Examiner—Kevin Lee
Assistant Examiner—Bryan C. Wallace
Attorney, Agent, or Firm—Kolisch Hartwell Dickinson McCormack & Heuser

[57] ABSTRACT

The invention provides a valve for regulating fluid flow. The valve having a collar, a plug and a flapper seal. The collar defining an aperture and having a base with an opening therein, with a shaft extending from the base within the aperture. The plug being movably and sealably mounted to the collar within the aperture and defining a passage for fluid flow through the valve. The passage being in fluid communication with the opening in the base of the collar. The plug co-operating with the shaft to retain the plug in the collar. The flapper seal is movably and sealably mounted to the shaft within the passage in the plug. The plug is movable between three positions, wherein the valve can be completely sealed, act as a one-way valve, or act as a two-way valve.

20 Claims, 6 Drawing Sheets

REMOVABLE THREE POSITION VALVE

FIELD OF THE INVENTION

The invention is in the field of mechanical valves for regulating fluid flow, particularly check valves.

BACKGROUND OF THE INVENTION

Dunnage bags are used in the transportation industry to brace cargo during transportation. The bags normally comprise an inner bladder of plastic, typically polyethylene, surrounded by several layers of reinforced paper. The bags are kept deflated when not in use so that they occupy relatively little space. When a cargo container is loaded with cargo, the bags are inserted into the voids between cargo, or between the cargo and the walls of the cargo container. The bags are then inflated to the desired size and pressure. The expanded bag exerts an outward pressure on the cargo, forcing the cargo against the walls of the cargo container, against other cargo, or against bulkheads. Consequently, the cargo is held in a relatively immobile state and is ready for safe transport. It is desirable to provide dunnage bags with mechanical valves adapted for quick inflation of the bags to a desired pressure.

Occasionally, dunnage bags are damaged in transit. In which case, it is desirable to have access to the interior of the bag to effect repairs, for example, by spraying sealant on the interior surface of the bag.

Inflation of the bags is typically accomplished through a valve that is attached to the bag surface. A hose is coupled to the valve and conveys pressurized gas, typically compressed air, through the valve and into the bag. When the bag reaches the desired inflation pressure, the hose may be removed, and the valve closed to prevent air from escaping.

Dunnage bag valves may be simple one-way valves. Such valves typically have a flapper seal kept in a shut position by a biasing spring force that allows air into the bag but not out of the bag. A disadvantage of this design is that the valve cannot be locked shut to prevent air from entering or exiting the bag, and cannot be locked open to allow air to enter or exit the bag. Such valves may require manual force to be exerted against the spring to deflate the bag.

Previously, some dunnage bag valves allowed air to flow into and out of the bag, but were not designed to be removed from the bag so that the interior of the bag could be accessed to effect repairs to the bag. Other valve designs have two pieces so that one piece can be removed from the other to allow access to the interior of the bag. A first piece ("plug") threads into a second piece ("collar"). The collar is mounted to the bag. When the plug is unscrewed completely it comes apart from the collar, exposing an orifice through which air can flow into or out of the bag (this is how deflation of the bag is achieved with such valves). In such valves, removing the plug from the collar also allows access to the interior of the bag to perform repairs on the bag. The plugs of such valves are easily lost or stolen because they are removable from the collar. To prevent loss of the plugs, some of the these valves connect the plug to the collar with a chain. However, the chain may become entangled when the valve is in operation. Also, the chain may make it difficult to attach an air hose to the valve to inflate the bag. Further, the plug may be lost or stolen in spite of the connecting chain if the chain is accidentally or deliberately severed. If the plug becomes detached from the collar, the plug may fall into the cargo being transported. In some instances, plugs lost in this way have caused serious damage to machinery that is subsequently used to handle the cargo.

SUMMARY OF INVENTION

The invention provides a valve for regulating fluid flow. The valve having a collar, a plug and a flapper seal. The collar defining an aperture and having a base with an opening therein, with a shaft extending from the base within the aperture. The plug being movably and sealably mounted to the collar within the aperture and defining a passage for fluid flow through the valve. The passage being in fluid communication with the opening in the base of the collar. The plug co-operating with the shaft to retain the plug in the collar. The flapper seal is movably and sealably mounted to the shaft within the passage in the plug. The plug is movable between three positions, as described below.

The plug is movable within the collar to a first "closed" position in which the plug sealably engages the aperture to prevent fluid flow through the valve.

The plug is movable within the collar to a second position in which one-way fluid flow is permitted through the valve. Fluid being prevented from flowing through the valve in a first direction by the flapper seal. The flapper seal being movable by fluid entering the valve from the first direction so that the flapper seal seals the passage in the plug to prevent fluid flow through the valve in the first direction. The flapper seal being movable by fluid entering the valve from a second direction so that the flapper seal does not seal the passage in the plug and fluid flow is permitted through the valve in the second direction.

The plug is movable within the collar to a third position in which two-way fluid flow is permitted through the valve, wherein the flapper seal cooperates with the shaft to prevent the flapper seal from sealing the passage in the plug.

The valve may further comprise a housing unit defining an orifice. The collar being removably mounted to the housing unit to seal the orifice. The collar and the plug being adapted to cooperate to engage a tool for removal of the collar from the housing unit, the plug being movable to secure the tool in engagement with the collar.

The valve may further comprise a removable cap mounted to the shaft. The plug cooperating with the cap on the shaft to retain the plug in the collar. The plug being removable from the collar when the cap is removed from the shaft.

The flapper seal may be adapted to engage the cap on the shaft when the plug is in the third position, the engagement between the flapper seal and the cap preventing the flapper seal from sealing the passage in the plug. The flapper seal may have an inner portion that engages the shaft and cooperates with the cap, and an outer portion that cooperates with the plug to seal the passage.

The valve may further comprise an inner ring fixed within the passage in the plug, the inner ring being adapted to be sealably engageable with the flapper seal in cooperation with the plug when the plug is in the second position.

The plug may further comprise a shoulder projecting into the passage for positioning the inner ring, the shoulder being adapted to position the inner ring out of engagement with the flapper seal when the valve is in the third position.

The plug may be threaded on an outer cylindrical surface and the collar threaded on an inner cylindrical surface, the plug being threadably rotatable within the collar to move the plug between the first position, through the second position and to the third position.

The valve may further comprise a housing unit defining an orifice. The collar being threaded on an outer cylindrical surface and threadably, and removably, mounted to the housing unit to seal the orifice. The collar and the plug being adapted to threadably cooperate to engage a tool for unscrewing the collar from the housing unit. The plug being threadably movable to secure the tool in engagement with the collar, particularly in engagement with indentations in the collar.

In one embodiment, the invention provides an improved dunnage bag valve which has the advantages of a valve that does not require a chain to connect the plug to the collar, a valve that has multiple operating positions, a valve that allows access into the interior of a dunnage bag, and a valve that is resistant to theft. The invention eliminates the need for a chain connecting the plug to the collar because the plug is rotatable within the collar but cannot be easily removed from it. The invention has multiple operating positions wherein the valve can be completely sealed, act as a one-way valve to inflate a dunnage bag, or act as a two-way valve to inflate or deflate the bag. Such an embodiment of the valve has a plug and collar unit that can be removed from a housing unit mounted on the bag, to permit access into the interior of the bag. The invention is made theft resistant by a design feature which permits the plug and collar unit to be removed from the housing unit only by a specially designed tool. To remove the plug and collar unit, the tool cooperates with the plug and with indentations on the surface of the collar.

DETAILED DESCRIPTION

Figure 1:
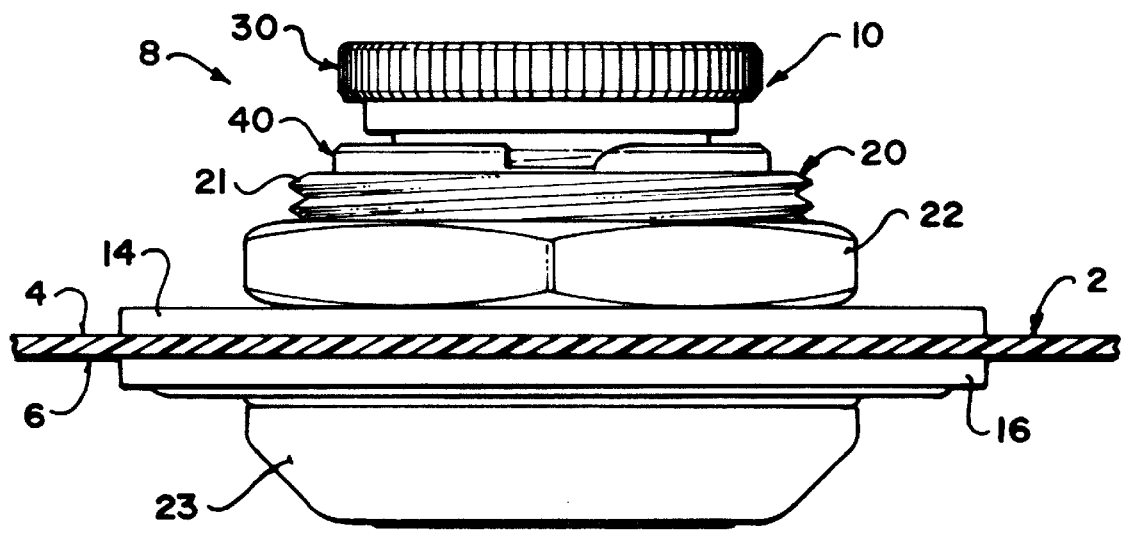
FIG. 1 is an exterior side view of the valve in a "first" closed position.

In an illustrated embodiment of the invention, valve 8 includes check valve assembly 10 and housing unit 20. Housing unit 20 is mounted to container 2, such as a dunnage bag, the container having an outside face 4 and an inside face 6.

Check valve assembly 10 includes plug 30 and collar 40. Plug 30 has on its outer cylindrical surface threads 31 and collar 40 has on its inner cylindrical surface threads 41, so that plug 30 is threadably mounted in collar 40. In alternative embodiments, plug 30 may be movable within collar 40 by other means for mounting plug 30 to collar 40, such as tracks or a detent mechanism. Check valve assembly 10 may be mounted within bore 25 in housing unit 20; housing unit 0-ring 26 sealing the engagement between check valve assembly 10 and housing unit 20.

Housing unit 20 may be sealably mounted to container 2. Outer threads 21 of housing unit 20 cooperating with nut 22 to clamp outer washer 14 and inner washer 16, respectively, to outside face 4 and inside face 6 of container 2. Cooperating deformations 17, 18 in washers 14, 16 may be used to improve the engagement of valve 8 to container 2. Flexible washer 19 is shown sealing the engagement between inner washer 16 and flange 24 on lower portion 23 of housing unit 20, to seal the container opening 15 defined by washers 14, 16 and container 2.

Collar 40 has a collar base 42 and defines aperture 45 between outer annular portion 47 and inner cylindrical portion 48. In the illustrated embodiment, collar base 42 has collar airway openings 43 disposed circumferentially around the centre thereof.

Shaft 50 extends from collar base bore 42 within the aperture defined by collar 40. Shaft 50 may be attached to the centre of collar base 42 and may extend upwardly past collar rim 44. Threaded end 53 of shaft 50 may be threadably mounted to collar base bore 49 and fixed into position with an adhesive on the threads.

Cap 60 may be attached to the top end 51 of shaft 50. Cap screw 66 may be used to attach cap 60 to shaft 50. Cap screw 66 may be fixed semi-permanently into position with an adhesive. Such an adhesive may be a heat labile adhesive, so that heating of cap screw 66 breaks down the adhesive and permits removal of cap screw 66, so that cap 60 may be removed from shaft 50, permitting removal of plug 30 from collar 40. The circumference of cap base 61 may be less than the circumference of cap rim 62. Around the circumference of cap sides 63, a plurality of cap holes 64 may be located to facilitate fluid flow through valve 8.

Plug 30 has shaft hole 32 in plug base 33, so that shaft 50 may pass there through. A plurality of plug airway holes 34 may be located around the circumference of the cylindrical part of plug 30 near plug base 33 to facilitate fluid flow through valve 8.

Inside plug 30 are flapper seal 70 and, in the illustrated embodiment, inner ring 80. Inner ring 80 may not be included if plug 30 is itself adapted to sealably engage flapper seal 70. Use of inner ring 80 may be advantageous for ease of assembly, in which case inner ring 80 is fixedly positioned within plug 30, for example as a "brass-fit" where plug 30 and inner ring 80 are made of brass. Flapper seal 70 defines flapper seal hole 71. Inner ring 80 defines ring hole 81. Shaft 50 projects through flapper seal hole 71 and ring hole 81. Shoulder 35 may be located circumferentially around the inside cylindrical surface of plug 30 to position inner ring 80. In the illustrated embodiment, when plug 30 is unscrewed from collar 40, inner ring 80 moves towards cap 60, and plug 30 is thus prevented from being separated from collar 40 by inner ring 80 abutting cap 60. Flapper seal 70 may be mushroom-shaped with inner portion 72 projecting towards cap 60 and outer portion 73 projecting towards plug base 33. Flapper seal 70 is slidably movable along shaft 50; movement of flapper seal 70 on shaft 50 may be constrained by inner ring 80 and plug base 33.

Figure 6:
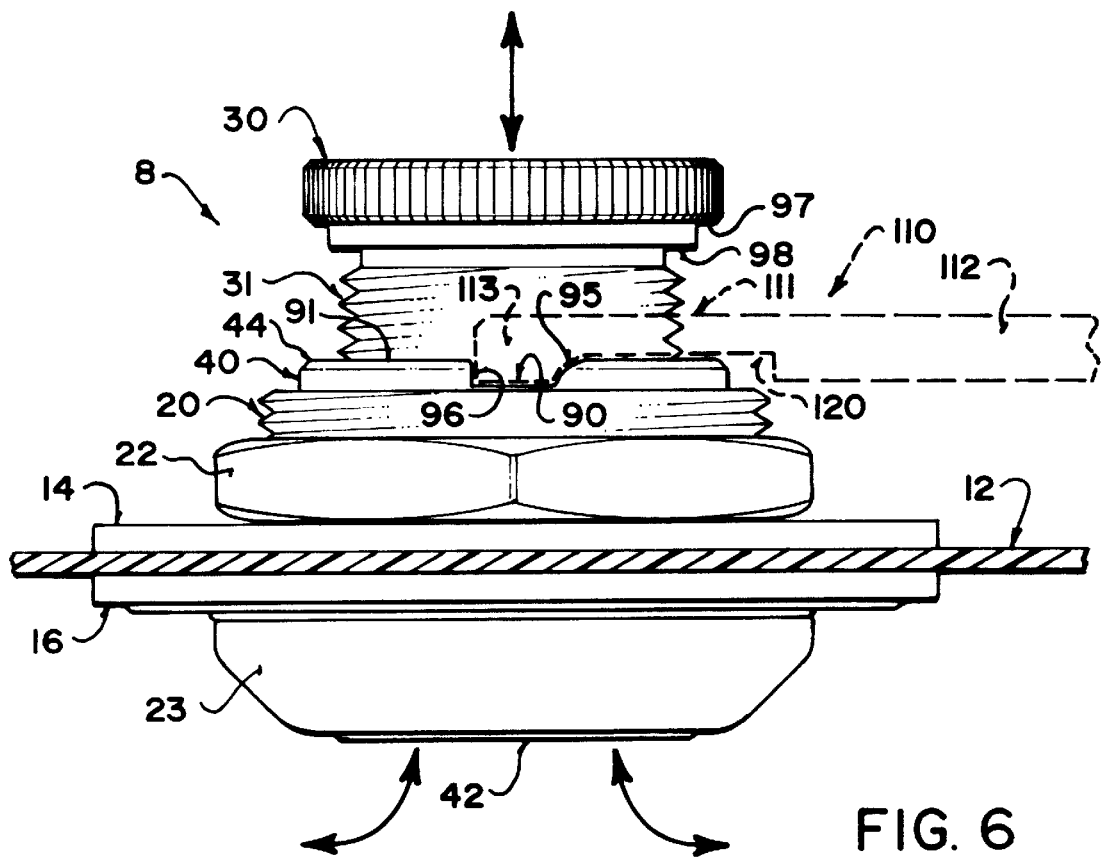
FIG. 6 is an exterior side view of the valve in the fully open "third" position, with arrows showing air flow into and out of the valve, and a tool in phantom engaging the valve.
Figure 7:
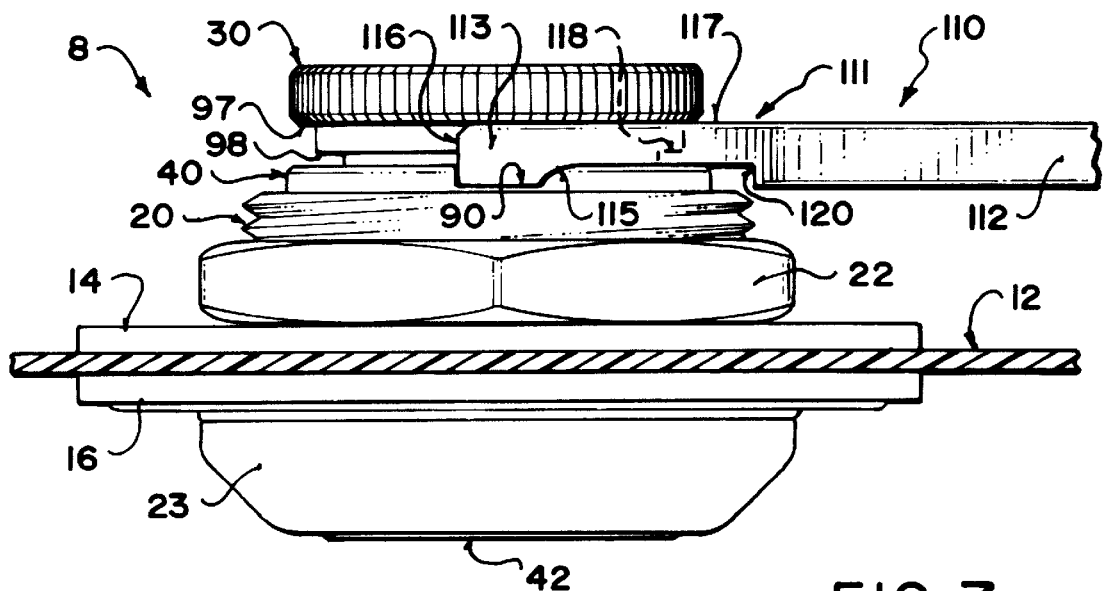
FIG. 7 is an exterior side view of the valve showing a tool engaging the valve for removal of the plug and collar unit from the housing.

In accordance with one aspect of the invention, there is provided a mechanism for removing check valve assembly 10 from housing unit 20. In one embodiment, this mechanism comprises indentations 90 disposed along the top annular surface 91 of the rim 44 of collar 40, indentations 90 being engageable by tool 110. As shown in FIG. 6, indentations 90 may comprise curved wall 95 and flat wall 96 to which tool engagement end 111 is matable. Indentations 90 are profiled so that tool 110 cannot securely engage indentations 90 to unscrew check valve assembly 10 from housing unit 20 unless tool 110 is biased against indentations 90 by upper flange 97 of plug 30. Upper flange 97 and shoulder 98 being formed to cooperate respectively with upper tool surfaces 117 and 118 to hold tool 110 in operable engagement with indentations 90, as shown in FIG. 7. Upper flange 97 may also be adapted to cooperate with standard air hose couplings to hold an air hose in engagement with valve 8 when filling container 2.

Figure 8:
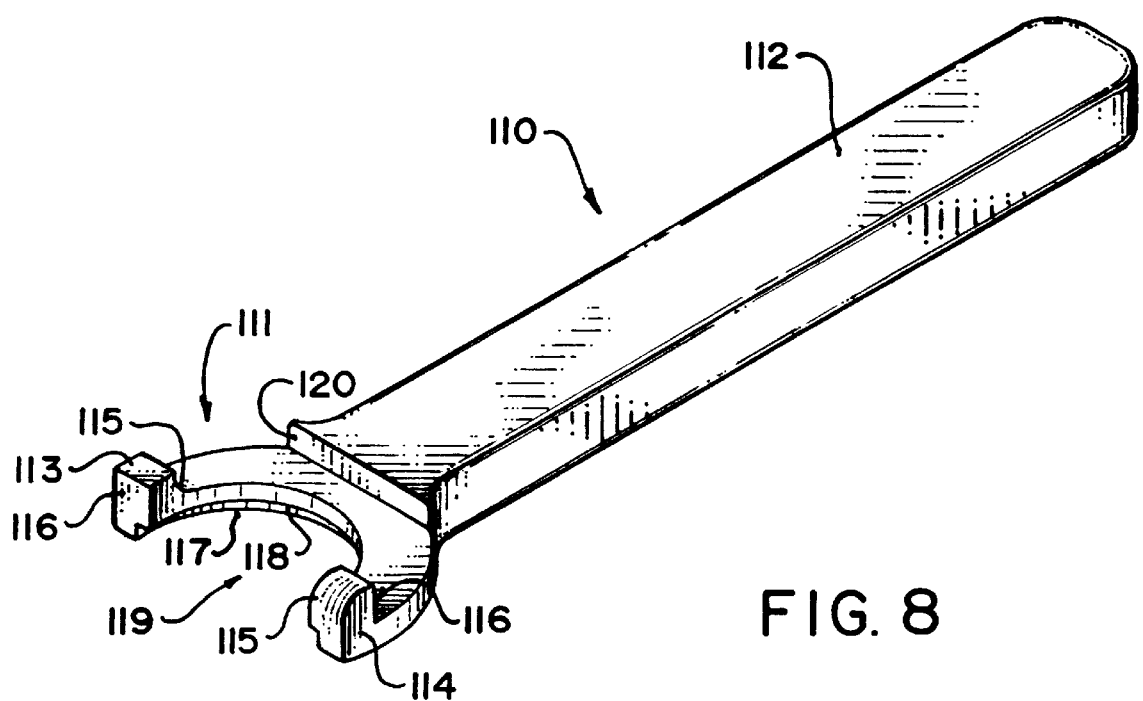
FIG. 8 is an isometric view of the tool for engaging the valve.
Figure 9:
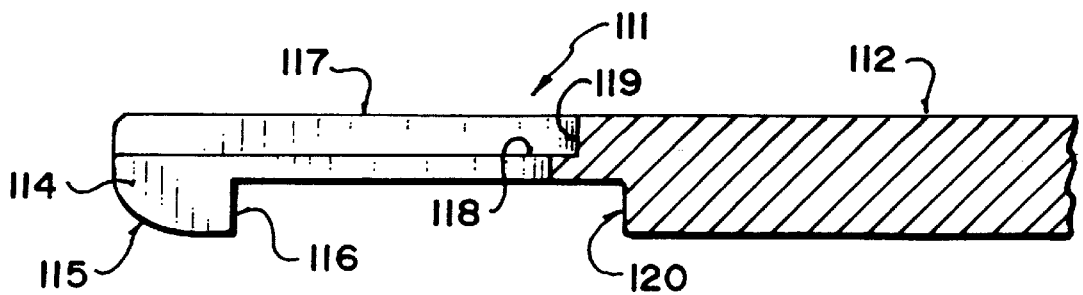
FIG. 9 is a broken-away side view in partial section of a portion of the tool of FIG. 8.

As shown in FIG. 8, tool 110 comprises engagement end 111 and handle 112. Lugs 113, 114 comprise curved portions 115 and flat portions 116. Arch 119 and surface 118 are adapted to engage plug 30 while recess 120 is adapted to accommodate housing unit 20.

Figure 2:
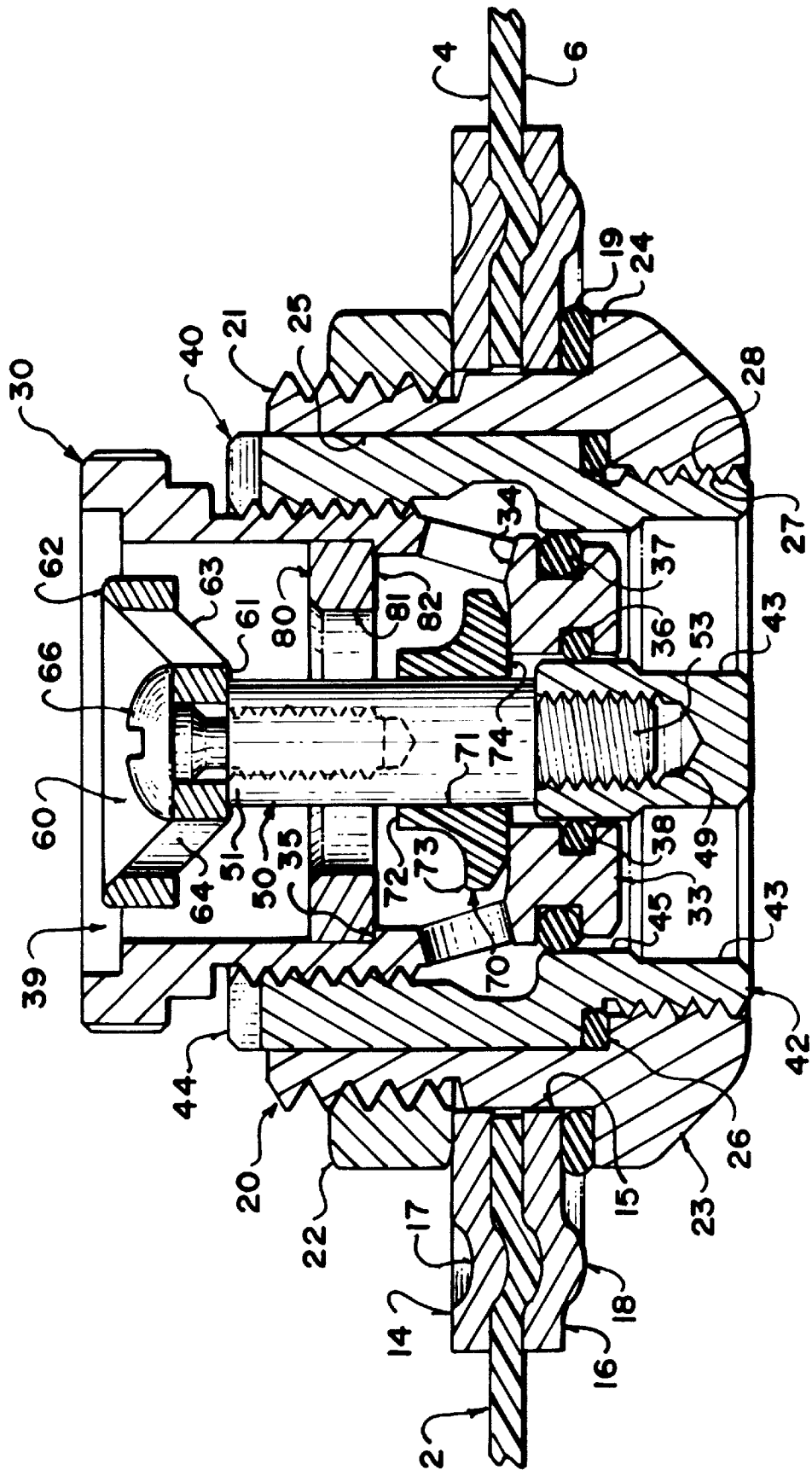
FIG. 2 is a cross-sectional side view of the valve in the "first" closed position.

Valve 8 has three operating positions. In a first "closed" position, shown in FIGS. 1 and 2, plug 30 is screwed into collar 40 so that check valve assembly 10 is sealed against collar 40 by outer plug O-ring 37 and inner plug O-ring 38, preventing air from moving in or out of container 2. O-ring 38 is seated in groove 36 in plug 30.

Figure 3:
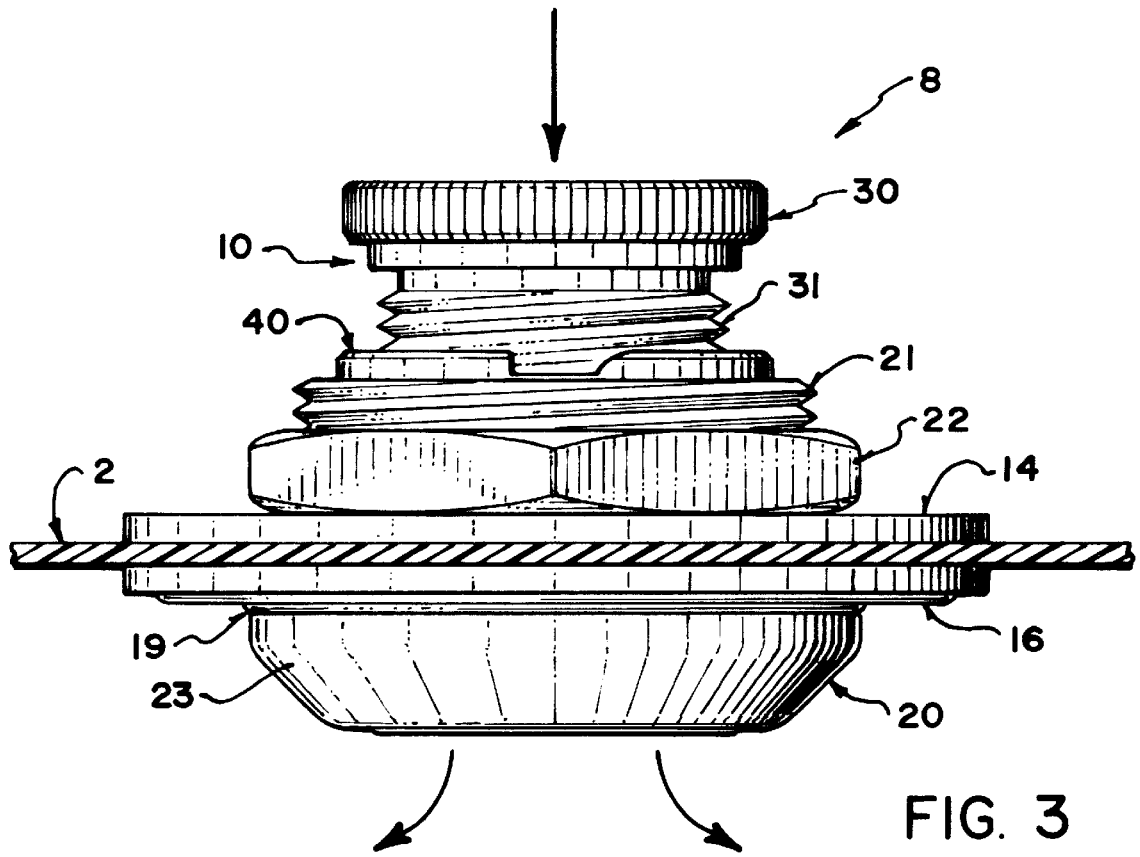
FIG. 3 is an exterior side view of the valve in a partly open "second" one-way position.
Figure 4:
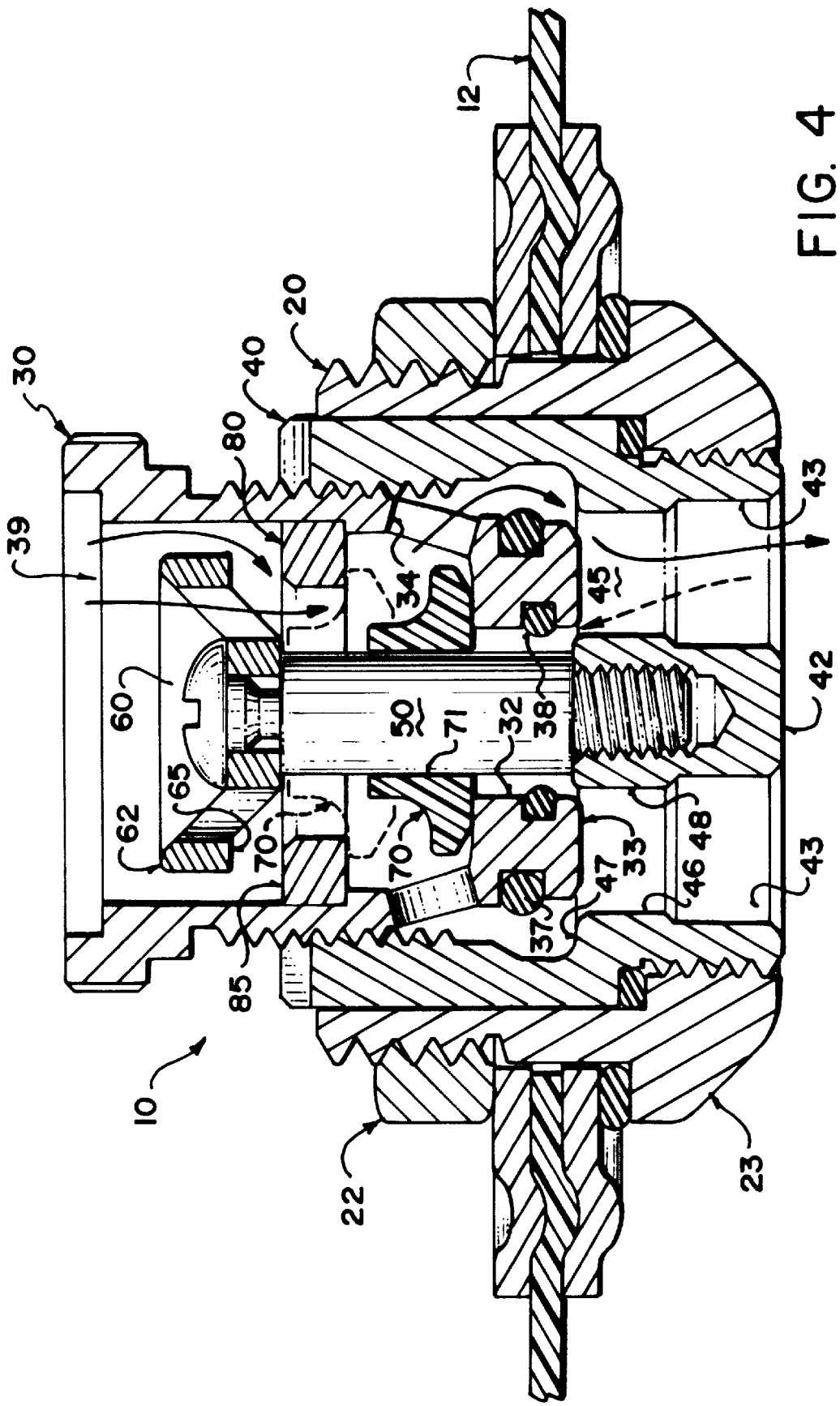
FIG. 4 is a cross-sectional side view of the valve in a partly open "second" one-way position, showing air flow into the bag with solid arrows and showing the valve sealed to air flowing out of the valve with dashed lines and arrows.

In a second "partly open" position, shown in FIGS. 3 and 4, plug 30 is partly unscrewed from collar 40 so that check valve assembly 10 acts as a one-way valve, allowing air to pass into container 2 but not out of container 2. A dunnage bag may be filled through valve 8 in the second position to a predetermined pressure, and that pressure maintained when the air hose is disconnected from the valve (before closing the valve by moving it to the first position). In the second position, air cannot leave container 2 because air flowing out of container 2 forces flapper seal 70 to seal against ring bottom face 81, thereby sealing check valve assembly 10 against air flow in that direction. Flapper seal 70 may be forced upwardly by air flowing against flapper seal bottom surface 74 through the space between shaft 50 and plug base 33. Air may also lift flapper seal 70 by flowing through plug holes 34 against outer portion 73 of flapper seal 70. Air is however able to enter container 2 because air may flow through cap holes 64 and through ring hole 81, forcing flapper seal 70 to abut against plug base 33, so that air may flow through plug holes 34 and aperture 45 in collar 40 into container 2.

Figure 5:
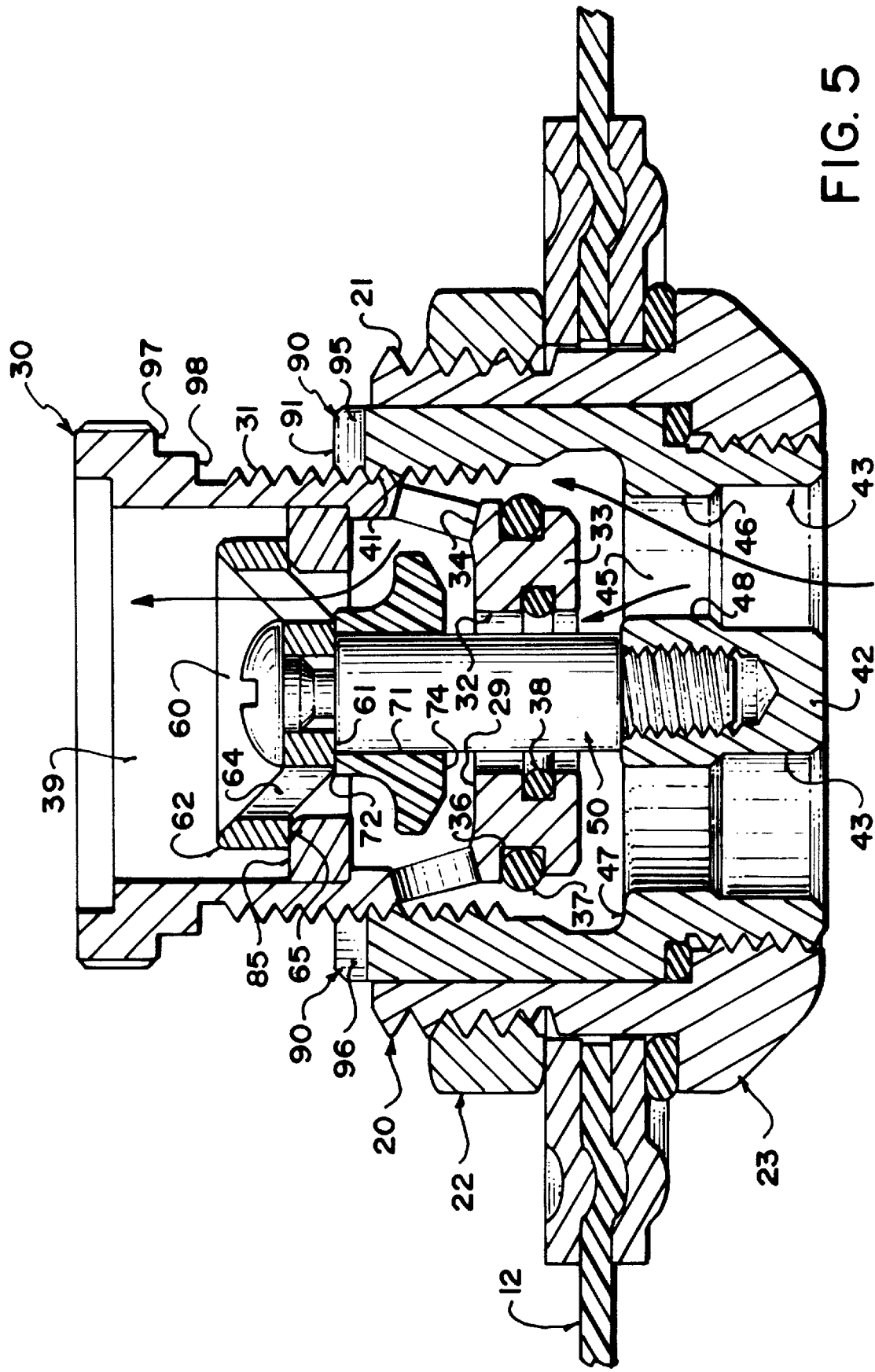
FIG. 5 is a cross-sectional side view of the valve in a fully open "third" position, with arrows showing air flowing out of the valve.

In a third "fully open" position, as shown in FIGS. 5 and 6, plug 30 is unscrewed until base portion 65 of cap 60 contacts upper face 85 of inner ring 80. In the third position, plug 30 remains attached to collar 40 so that check valve assembly 10 is in a fully open position, allowing air to pass in and out of container 2. In the third position, air can pass out of container 2 because flapper seal 70 and inner ring 80 cannot abut against each other. Flapper seal inner portion 72 may abut against cap 60, preventing contact between flapper seal outer portion 73 and inner ring 80, thereby preventing flapper seal 70 from sealing the passage in plug 30. It will be seen from the positioning of flapper seal 70 in plug 30 in the third position that air can also flow into container 2 in the third position.

Many alterations and modifications in the practice of the invention are possible in accordance with the functional requirements and other aspects of the foregoing disclosure. Accordingly, the scope of the invention is to be construed in accordance with the substance defined by the following claims.

I claim:

1. A valve for regulating fluid flow comprising:
   a collar defining an aperture, the collar having a base with an opening therein and a shaft extending from the base within the aperture;
   a plug movably and sealably mounted to the collar within the aperture, the plug defining a passage for fluid flow through the valve, the passage being in fluid communication with the opening in the base of the collar, the plug co-operating with the shaft to retain the plug in the collar;
   a flapper seal movably and sealably mounted to the shaft within the passage in the plug;
   the plug being movable within the collar to a first position in which the plug sealably engages the aperture to prevent fluid flow through the valve;
   the plug being movable within the collar to a second position in which one-way fluid flow is permitted through the valve, fluid being prevented from flowing through the valve in a first direction by the flapper seal, the flapper seal being movable by fluid entering the valve from the first direction so that the flapper seal seals the passage in the plug to prevent fluid flow through the valve in the first direction, the flapper seal being movable by fluid entering the valve from a second direction so that the flapper seal does not seal the passage in the plug and fluid flow is permitted through the valve in the second direction;
   the plug being movable within the collar to a third position in which two-way fluid flow is permitted through the valve, wherein the flapper seal cooperates with the shaft to prevent the flapper seal from sealing the passage in the plug.

2. The valve of claim 1 further comprising a housing unit defining an orifice, the collar being removably mounted to the housing unit to seal the orifice, the collar and the plug being adapted to cooperate to engage a tool for removal of the collar from the housing unit, the plug being movable to secure the tool in engagement with the collar.

3. The valve of claim 1 further comprising a removable cap mounted to the shaft, wherein the plug cooperates with the shaft to retain the plug in the collar by cooperation between the plug and the cap on the shaft, the plug being removable from the collar when the cap is removed from the shaft.

4. The valve of claim 3 wherein the flapper seal is adapted to engage the cap on the shaft when the plug is in the third position, the engagement between the flapper seal and the cap preventing the flapper seal from sealing the passage in the plug.

5. The valve of claim 4 wherein the flapper seal has an inner portion that engages the shaft and cooperates with the cap, and an outer portion that cooperates with the plug to seal the passage.

6. The valve of claim 1 further comprising an inner ring fixed within the passage in the plug, the inner ring being adapted to be sealably engageable with the flapper seal in cooperation with the plug when the plug is in the second position.

7. The valve of claim 6 wherein the plug further comprises a shoulder projecting into the passage for positioning the inner ring, the shoulder being adapted to position the inner ring in the passage in the plug.

8. The valve of claim 1 wherein the plug is threaded on an outer cylindrical surface and the collar is threaded on an inner cylindrical surface, the plug being threadably rotatable within the collar to move the plug between the first position and the second position or between the second position and the third position.

9. The valve of claim 8 further comprising a housing unit defining an orifice, wherein the collar is threaded on an outer cylindrical surface and the collar is threadably and removably mounted to the housing unit to seal the orifice, the collar and the plug being adapted to threadably cooperate to engage a tool for unscrewing the collar from the housing unit, the plug being threadably movable to secure the tool in engagement with the collar.

10. A valve for regulating fluid flow into and out of a container having an interior and an exterior, the valve having an interior side positioned towards the interior of the container and an exterior side positioned towards the exterior of the container, the valve comprising:

a housing unit mounted to the container defining an orifice;

a collar removably mounted to the housing unit to seal the orifice, the collar defining an aperture, the collar having a base on the interior side of the valve with an opening therein and a shaft extending from the base within the aperture towards the exterior side of the valve;

a plug movably and sealably mounted to the collar within the aperture, the plug defining a passage for fluid flow through the valve into and out of the container, the passage being in fluid communication with the opening in the base of the collar, the plug co-operating with the shaft to retain the plug in the collar;

a flapper seal movably and sealably mounted to the shaft within the passage in the plug;

the plug being movable within the collar to a first position towards the interior side of the valve in which position the plug sealably engages the aperture to prevent fluid flow through the valve into or out of the container;

the plug being movable within the collar from the first position to a second position towards the exterior side of the valve, in which position one-way fluid flow into the container is permitted through the valve, fluid being prevented from flowing through the valve out of the container by the flapper seal, the flapper seal being movable by fluid flowing out of the container so that the flapper seal seals the passage in the plug to prevent fluid flow through the valve out of the container, the flapper seal being movable by fluid into the container so that the flapper seal does not seal the passage in the plug and fluid flow is permitted through the valve into the container;

the plug being movable within the collar from the second position to a third position towards the exterior side of the valve, in which position two-way fluid flow is permitted through the valve into or out of the container, wherein the flapper seal cooperates with the shaft to prevent the flapper seal from sealing the passage in the plug.

11. The valve of claim 10 wherein the collar and the plug are adapted to cooperate to engage a tool on the exterior side of the valve for removal of the collar from the housing unit, the plug being movable to secure the tool in engagement with the collar on the exterior side of the valve.

12. The valve of claim 10 further comprising a removable cap mounted to the shaft on the exterior side of the valve, wherein the plug cooperates with the shaft to retain the plug in the collar by cooperation between the plug and the cap on the shaft, the plug being removable from the collar when the cap is removed from the shaft.

13. The valve of claim 10 wherein the flapper seal is adapted to engage the cap on the shaft when the plug is in the third position, the engagement between the flapper seal and the cap preventing the flapper seal from sealing the passage in the plug.

14. The valve of claim 13 wherein the flapper seal has an inner portion that engages the shaft and cooperates with the cap, and an outer portion that cooperates with the plug to seal the passage.

15. The valve of claim 10 further comprising an inner ring fixed within the passage in the plug, the inner ring being adapted to be sealably engageable with the flapper seal in cooperation with the plug when the plug is in the second position.

16. The valve of claim 15 wherein the plug further comprises a shoulder projecting into the passage for positioning the inner ring, the shoulder being adapted to position the inner ring in the passage in the plug.

17. The valve of claim 10 wherein the plug is threaded on an outer cylindrical surface and the collar is threaded on an inner cylindrical surface, the plug being threadably rotatable within the collar to move the plug between the first position and the second position or between the second position and the third position.

18. The valve of claim 17 wherein the housing unit is threaded on an inner cylindrical surface, the collar is threaded on an outer cylindrical surface and the collar is threadably and removably mounted to the housing unit to seal the orifice, the collar and the plug being adapted to threadably cooperate to engage a tool for unscrewing the collar from the housing unit, the plug being threadably movable to secure the tool in engagement with the collar.

19. A valve for regulating fluid flow comprising:

a collar defining an aperture, the collar having a base with an opening therein and a shaft extending from the base within the aperture, a removable cap being mounted to the shaft;

a plug threadably and sealably mounted to the collar within the aperture, the plug defining a passage for fluid flow through the valve, the passage being in fluid communication with the opening in the base of the collar, the plug co-operating with the cap on the shaft to retain the plug in the collar, the plug being removable from the collar when the cap is removed from the shaft, the plug having a shoulder projecting into the passage;

a flapper seal movably and sealably mounted to the shaft within the passage in the plug, the flapper seal having an inner portion that engages the shaft and cooperates with the cap, and an outer portion that cooperates with the plug to seal the passage;

an inner ring fixed within the passage in the plug, the inner ring being adapted to be sealably engageable with the flapper seal in cooperation with the plug;

the plug being threadably movable within the collar to a first position in which the plug sealably engages the aperture to prevent fluid flow through the valve;

the plug being threadably movable within the collar to a second position in which one-way fluid flow is permitted through the valve, fluid being prevented from flowing through the valve in a first direction by the flapper seal, the flapper seal being movable by fluid entering the valve from the first direction so that the flapper seal engages the inner ring and seals the passage in the plug to prevent fluid flow through the valve in the first direction, the flapper seal being movable by fluid entering the valve from a second direction so that the flapper seal disengages the inner ring and does not seal the passage in the plug and fluid flow is permitted through the valve in the second direction;

the plug being threadably movable within the collar to a third position in which two-way fluid flow is permitted through the valve, wherein the flapper seal cooperates with the shaft to prevent the flapper seal from sealing the passage in the plug, the flapper seal being adapted to engage the cap on the shaft when the plug is in the third position, the engagement between the flapper seal and the cap preventing the flapper seal from sealing the passage in the plug, the shoulder on the plug supporting the inner ring out of engagement with the flapper seal when the valve is in the third position.

20. The valve of claim 19 further comprising a housing unit for mounting the valve to a container, the housing unit defining an orifice, wherein the collar is threaded on an outer cylindrical surface and the collar is threadably and removably mounted to the housing unit to seal the orifice, the collar and the plug being adapted to threadably cooperate to engage a tool for unscrewing the collar from the housing unit, the plug being threadably movable to secure the tool in engagement with the collar.

* * * * *